Jan. 15, 1963 P. BECKMAN 3,074,040
MONO-FILAMENT STRAIN GAGE
Filed July 18, 1960

INVENTOR.
Paul Beckman
BY
ATTORNEY

United States Patent Office 3,074,040
Patented Jan. 15, 1963

3,074,040
MONO-FILAMENT STRAIN GAGE
Paul Beckman, Glen Olden, Pa.
(944 Henrietta Ave., Huntington Valley, Pa.)
Filed July 18, 1960, Ser. No. 43,455
7 Claims. (Cl. 338—2)

This invention relates to mono-filament strain gage units of the electrical resistance type in which the filament is bonded throughout its effective length, and more particularly to a unit of this type that is adapted to be embedded in a structure whose strains are to be measured.

Various types of strain gage units of the type to be embedded in a structure have been proposed and used such, for example, as shown in Simmons Patent No. 2,344,-648. One difficulty of these prior gage units has been the inability to position the strain responsive filament precisely on the neutral axis of the unit so that the gage when embedded in a structure will have its filament positioned on the neutral axis of the structure thereby measuring axial strains within the structure independently of bending strains therein. In a gage of said Simmons type such bending effects are attempted to be minimized by reason of the strain gage filament being in the form of an elongated loop in which the two substantially parallel arms of the loop lie substantially parallel to the neutral axis of the gage unit but laterally spaced therefrom. Any bending effects thus cause one strand to be in tension and the other in compression thereby neutralizing changes of electrical resistance arising from the bending effects. On the other hand it is sometimes desirable to measure bending effects by having the gage filament displaced from but disposed parallel to the neutral axis. The loop filament type of gage is not adapted to perform this function.

An object of my invention is to provide improved bonded filament gage unit of the electrical resistance type whose principles of construction are such that the filament may be placed with a great deal of accuracy along the neutral axis of the gage unit thereby substantially eliminating changes in electrical resistance of the filament arising from bending effects.

A still further object is to provide an improved bonded filament gage unit of the electrical resistance type whose principles of construction permit the gage filament to be offset from the neutral axis so as to be responsive to and be able to measure bending effects in a structure in which the gage unit is embedded.

A still further object is to provide an improved bonded filament gage unit of the electrical resistance type whose principles of construction allow the unit to be effectively made in sub-miniaturized size, and still permit the gage filament to be disposed either along the neutral axis to eliminate bending effects or offset from the neutral axis to measure the bending effects.

In accomplishing the foregoing as well as other objects of my invention I utilize a mono-filament in which the effective strain responsive portion of the filament extends along a single straight line without any effective strain responsive portion reversing back on itself to form a loop.

Other objects and advantages will be more apparent to those skilled in the art from the following description of the accompanying drawings in which.

Figure 3:
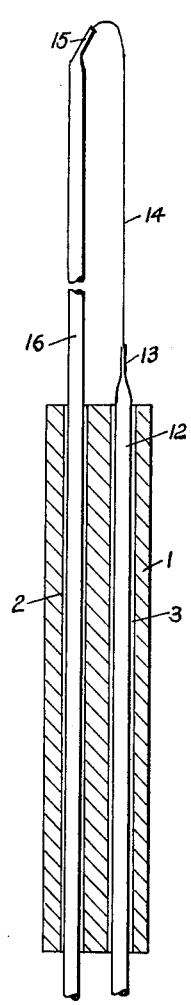
FIG. 3 is a still greater enlarged view showing the elements prior to being encased to form the completed gage unit.
Figure 4:
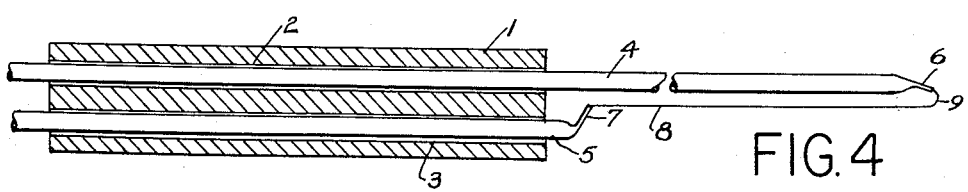
FIG. 4 is a still further enlarged longitudinal sectional view of a certain portion of the elements prior to being encased within the gage unit and showing how the unit is constructed to enable the filament to be accurately positioned on the neutral axis.
Figure 5:
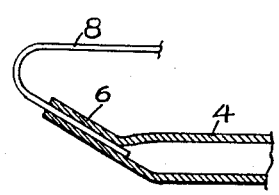
FIG. 5 is a very much enlarged fragmentary sectional view showing how the filament is secured in the leads.

In the particular embodiments of the invention disclosed herein for purposes of illustration I have shown in FIG. 4 my neutral axis type gage unit having a pilot body 1 of suitable insulation material such as either porcelain for high temperature work or of suitable plastics for ambient temperatures. This body may be of any suitable cross-sectional form, preferably circular, and has two axially extending holes 2 and 3 through which tubular metallic electrical leads 4 and 5 extend, it being noted in FIGS. 3 and 4 that the transverse dimension of the leads is less than that of the passages. One end of each of these tubes is suitably flattened as at 6 and 7 to receive the mono electrical resistance strain gage filament 8 preferably in the form of a wire which extends as shown in FIG. 5 within the flattened ends of the tubular leads. A firm electrical contact is made between the leads and filament by swaging the lead onto the filament. It will be noted that this construction permits the flattened ends 6 and 7 of the leads to be bent inwardly toward the neutral axis of the gage unit shown in FIG. 4. The curved end 9 of the filament where it enters the end 6 of conductor 4 is for all practical purposes free of axial strain not only because the portion 9 extends primarily in a transverse direction but also because this bend in actual practice is extremely minute compared to the active length of the filament 8. In fact both forms of gages disclosed herein, when fully completed with encasing material, have a sub-miniaturized outside diameter of .040" and a length of ½".

Figure 1:
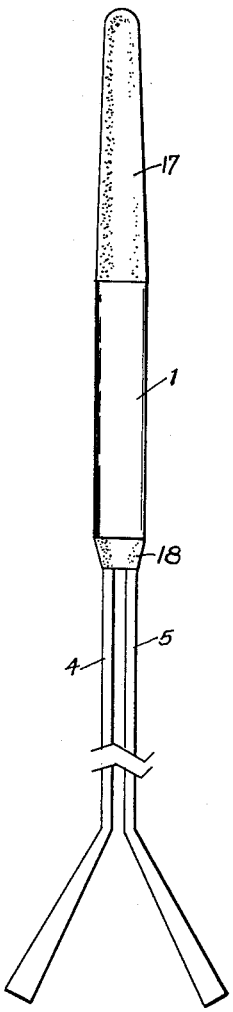
FIG. 1 is a greatly enlarged side elevation of my improved gage unit for either type of gage filament.
Figure 2:
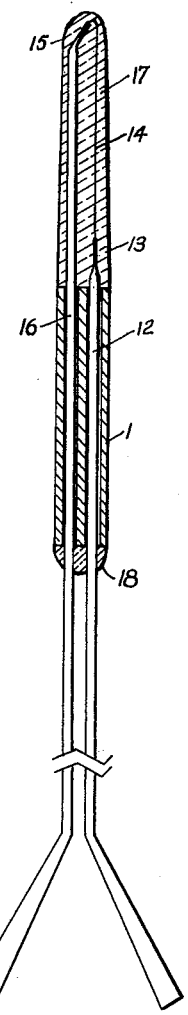
FIG. 2 is a greatly enlarged longitudinal sectional view of my improved gage unit in which the gage filament is arranged for measuring bending strains.

In the gage unit shown in FIGS. 2 and 3 for measuring bending effects the short lead 12 has its flattened end 13 extending straight in the direction of the mono-filament 14 and the flattened end 15 of the other metallic tubular lead 16 is flattened and bent to the extent that will allow the filament 14 to be disposed parallel to but offset from the neutral axis of the gage unit.

It is thus seen that the principles of construction of my improved gage readily permits it to be made either with the mono-filament on the neutral axis so to be free of bending effects or to be displaced from the neutral axis so as to measure bending effects.

In either form the filament and the portions of the leads connected thereto are encased in a suitable ceramic material 17 extending from the body 1 while the other end of this body is preferably cemented to the leads by a small portion of ceramic 18. The portion 17 is preferably tapered so that it may easily enter a suitable opening of a structure in which the gage is to be embedded while the straight cylindrical portion of the body 1 provides a pilot portion of the gage unit to center the same within such opening. The fact that the encasing material 17 may be porcelain as is also, preferably, the body 1 it is seen that this gage unit is readily adapted for use with extremely high temperatures.

It will of course be understood that the ceramic portion 17 is firmly bonded to the filaments 8 or 14 as the case may be throughout their effective lengths so that when the gage unit is embedded within and completely cemented to a structure whose strain is to be measured the mono-filament will respond faithfully to deformations in tension and compression, or in bending, as the case may be.

From the foregoing disclosure it is seen that I have provided a highly effective gage unit that may be made in sub-miniature or micro-minature size while still maintaining complete control and disposition of the mono-filament in a manner to either place the filament accurately on the neutral axis, or if desired to be offset therefrom for measuring bending strains. The ability to maintain the foregoing complete control and disposition of the filaments whereby they are respectively accurately placed is clearly shown in FIGS. 3 and 4 wherein the leads structurally support the filaments prior to being encased by the ceramic insulation 17. The construction is relatively simple and economical to manufacture notwithstanding its extremely minute size.

It will, of course, be understood that various changes in details of construction and arrangement of parts may be made by those skilled in the art without departing from the spirit of the invention as set forth in the appended claims.

I claim:

1. An axially extending strain gage unit to be bonded to the surface of a specimen whose strain is to be measured, said unit having a pair of axially extending long and short substantially parallel electrical leads so that one of their corresponding ends extends beyond the other, an electric resistance mono-strain sensitive filament having its opposite ends connected to said corresponding ends of said leads so that the filament extends in the same axial direction as the leads, a pilot body of insulation material having from end to end thereof a pair of axially extending substantially parallel passages, said leads being of less transverse dimension than that of the passages and extending through said passages with the long and short portions of the leads disposed beyond one end of the pilot body to the points of connection to the sensitive filament, and insulation means separate from the body but encasing and being completely bonded to the filament throughout its effective length and to all of that portion of the leads extending from the pilot body to the lead ends to which the filament is attached, the filament prior to its encasement by the insulation being supported by the leads in their given axial position.

2. The combination set forth in claim 1 further characterized by the provision of insulation means sealing the leads to the other end of the pilot body as the leads extend into the same.

3. An axially extending strain gage unit, the filament prior to its encasement by the insulation being supported by the leads in their given axial position having a pair of axially extending long and short substantially parallel tubular electrical leads so that one of their corresponding ends extends beyond the other, a pilot body having from end to end thereof a pair of axially extending substantially parallel passages through which the leads extend, the extended portion of the long lead having its end partially bent but only to the extent that it continues toward the end of the gauge unit, an electrical mono-strain sensitive filament having a portion extending into the tubular bent portion of the long lead which is swaged to the filaments, the filament then being bent backward so as to be substantially parallel to such long lead, and the other end of said filament extending into the tubular end of the short lead which is swaged to the filament, the filament being supported by the leads in its said parallel position.

4. An axially extending strain gage unit having a pair of axially extending long and short substantially parallel tubular electrical leads so that one of their corresponding ends extends beyond the other, a pilot body having from end to end thereof a pair of axially extending substantially parallel passages through which the leads extend, the extended portion of the long lead having its end partially bent but only to the extent that it continues toward the end of the gage unit, an electrical mono-strain sensitive filament having a portion extending into the tubular bent portion of the long lead which is swaged to the filament, the filament being bent backward so as to be substantially parallel to such long lead, and the other end of said filament extending into the tubular end of the short lead which is swaged to the filament, and insulation means encasing and being completely bonded to the filament and to all of that portion of the leads extending from the pilot body to the lead ends to which the filament is attached.

5. An axially extending strain gage unit having a pair of axially extending long and short substantially parallel tubular electrical leads so that one of their corresponding ends extends beyond the other, a pilot body having from end to end thereof a pair of axially extending substantially parallel passages through which the leads extend, the extended portion of the long lead having its end partially bent but only to the extent that it continues toward the end of the gage unit, an electrical monostrain sensitive filament having a portion extending into the tubular bent portion of the long lead which is swaged to the filament, the filament being bent backward so as to be substantially parallel to such long lead, and the other end of said filament extending into the tubular end of the short lead which is swaged to the filament, the lead ends to which the filament is connected being bent in opposite directions but both toward the gage axis thereby to support the filament substantially along such axis.

6. An axially extending strain gage unit to be bonded to the surface of a specimen whose strain is to be measured, said unit having a pair of axially extending long and short substantially parallel tubular electrical leads so that one of their corresponding ends extends beyond the other, the extended portion of the long lead having its end bent, an electrical mono-strain sensitive filament having a portion extending into the tubular bent portion of the long lead which is swaged to the filament, the filament extending back in substantially parallel relationship to said long lead and extending into the tubular end of the short lead which is swaged to the filament, and insulation means completely bonded to the filament throughout its effective length and to that portion of the short lead connected to the filament and to that portion of the long lead that is substantially parallel to the filament, the filament prior to its bonding by the insulation means being supported by the leads in its said parallel relationship.

7. An axially extending strain gage unit to be bonded to the surface of a specimen whose strain is to be measured, said unit having a pair of axially extending long and short substantially parallel electrical leads so that one of their corresponding ends extends beyond the other, the corresponding lead ends being bent in opposite directions but both toward and terminating substantially at the axial axis of the gage, an electrical mono-strain sensitive filament connected to said corresponding ends so as to be supported substantially along said axis, and insulation means encasing and being completely bonded to the filament throughout its effective length and to the end of the short lead end to which the filament is attached and to that portion of the long lead that is substantially parallel to the filament and to the long lead end which is connected to the filament thereby to provide an integral unit in which the filament lies substantially on the gage axis, the filament prior to its encasement by the insulation means being supported by the leads along said axis.

References Cited in the file of this patent
UNITED STATES PATENTS

| | | |
|---|---|---|
| 2,318,102 | Ruge | May 4, 1943 |
| 2,336,500 | Osterburg | Dec. 14, 1943 |
| 2,892,993 | Kiernan | June 30, 1959 |
| 2,948,872 | Beckman | Aug. 9, 1960 |